(12) United States Patent
Tsumura

(10) Patent No.: US 11,940,540 B2
(45) Date of Patent: Mar. 26, 2024

(54) POSITION CORRECTION INFORMATION DELIVERY SYSTEM AND METHOD, BASE STATION, AND PROGRAM

(71) Applicant: NEC Corporation, Tokyo (JP)

(72) Inventor: Shusuke Tsumura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 421 days.

(21) Appl. No.: 17/295,128

(22) PCT Filed: Nov. 20, 2019

(86) PCT No.: PCT/JP2019/045512
§ 371 (c)(1),
(2) Date: May 19, 2021

(87) PCT Pub. No.: WO2020/105689
PCT Pub. Date: May 28, 2020

(65) Prior Publication Data
US 2022/0018968 A1   Jan. 20, 2022

(30) Foreign Application Priority Data
Nov. 22, 2018   (JP) .................................. 2018-219155

(51) Int. Cl.
G01S 19/07       (2010.01)
G01S 19/25       (2010.01)
G01S 19/42       (2010.01)

(52) U.S. Cl.
CPC ............ *G01S 19/073* (2019.08); *G01S 19/25* (2013.01); *G01S 19/421* (2013.01)

(58) Field of Classification Search
CPC ...... G01S 19/073; G01S 19/25; G01S 19/421; G01S 19/04; G01S 19/43; H04W 4/02
(Continued)

(56) References Cited

U.S. PATENT DOCUMENTS 5,926,117 A * 7/1999 Gunji ....................... G08G 1/22
                                                         340/991
10,667,196 B2 * 5/2020 Kusano ................. H04W 36/08
(Continued)

FOREIGN PATENT DOCUMENTS

JP    2002-228739 A    8/2002
JP    2002-257919 A    9/2002
(Continued)

OTHER PUBLICATIONS

International Search Report for PCT Application No. PCT/JP2019/045512, dated Feb. 25, 2020.

*Primary Examiner* — Don N Vo

(57) ABSTRACT

In a position correction information delivery system using a positioning scheme in which a receiver and a reference station measure a phase of a carrier wave from a satellite and position information of the receiver is obtained in real time based on position correction information transmitted from the reference station, the receiver transmits a request for position correction information to a first base station managing a cell that the receiver camps on, on reception of the request from the receiver, the first base station selects a nearby second base station having a reference station or a nearby reference station from those registered in a database, receives the position correction information from the selected second base station or reference station, and broadcasts the position correction information to the cell.

20 Claims, 11 Drawing Sheets

(58) Field of Classification Search
 USPC ........................................... 455/456.1
 See application file for complete search history.

(56) References Cited

U.S. PATENT DOCUMENTS

| | | | |
|---|---|---|---|
| 10,838,069 B2* | 11/2020 | Kadelka | G01S 19/073 |
| 11,125,884 B2* | 9/2021 | Zhang | G01S 19/073 |
| 11,300,686 B2* | 4/2022 | Lin | G01S 19/41 |
| 2002/0101374 A1 | 8/2002 | Mutoh et al. | |
| 2018/0246220 A1 | 8/2018 | Zhang et al. | |
| 2019/0313215 A1* | 10/2019 | Sakaibara | H04W 72/04 |
| 2019/0324149 A1 | 10/2019 | Lin | |

FOREIGN PATENT DOCUMENTS

| | | |
|---|---|---|
| JP | 2002-318273 A | 10/2002 |
| JP | 2003-219448 A | 7/2003 |
| JP | 2014-173891 A | 9/2014 |
| WO | 2017/071650 A1 | 5/2017 |
| WO | 2018/121623 A1 | 7/2018 |

* cited by examiner

FIG. 4

| TYPE | CELL ID | ANTENNA LOCATION | RTK REFERENCE STATION? | RTK REFERENCE STATION LOCATION | ... |
|---|---|---|---|---|---|
| BASE STATION | 0000000001 | xx.xxx, xx.xxx | NO | xx.xxx, xx.xxx | ... |
| BASE STATION | 0000000002 | xx.xxx, xx.xxx | YES | xx.xxx, xx.xxx | ... |
| BASE STATION | 0000000003 | xx.xxx, xx.xxx | NO | xx.xxx, xx.xxx | ... |
| RTK REFERENCE STATION | NULL | NULL | YES | xx.xxx, xx.xxx | ... |
| ... | ... | ... | ... | ... | ... |

16: BASE STATION DATABASE

POSITION CORRECTION INFORMATION DELIVERY SYSTEM AND METHOD, BASE STATION, AND PROGRAM

This application is a National Stage Entry of PCT/JP2019/045512 filed on Nov. 20, 2019, which claims priority from Japanese Patent Application 2018-219155 filed on Nov. 22, 2018, the contents of all of which are incorporated herein by reference, in their entirety.

FIELD

Reference to Related Application

The present invention is based upon and claims the benefit of the priority of Japanese patent application No. 2018-219155 filed on Nov. 22, 2018, the disclosure of which is incorporated herein in its entirety by reference thereto.

The present invention relates to a position correction information delivery system and method, base station, and program.

Background

Code positioning (single-point positioning) is utilized by a smartphone, car navigation system and so forth, as positioning using GNSS (Global Navigation Satellite System). In code positioning, a pseudo distance between a satellite and a receiver is measured from a time difference between a code replica generated in the receiver and a code actually received. Distance measurement signal C/A (coarse/acquisition) code, which is transmitted in commonly used L1 of GPS (Global Positioning System), has a chip rate (bit rate) of 1.023 MHz (megahertz), one tenth of a GPS fundamental frequency $f_0$=10.23 MHz and is generated with 1023 pseudo-random codes (1023 chips). Length of one chip is about 293 m and a repetition period is 1 ms (millisecond). Since a receiver detects a code deviation at a resolution of about one-hundredth chip, a pseudo distance between a satellite and a receiver measured by code positioning is accurate to several meters. Hence, positioning accuracy of the code positioning is limited to several meters.

Carrier positioning utilizing a carrier phase of GPS signal is used in situations where high-precision positioning is required, such as surveying, autonomous driving, and controlling of heavy machinery at construction sites. One wavelength of L1 carrier wave of the GPS signal is about 19 cm (centimeter), and a distance can be obtained with an accuracy of one-hundredth of the wavelength of the carrier wave from a phase of the carrier wave.

In carrier positioning, a distance between a satellite and a receiver is measured by measuring a carrier phase at a reception time thereof by the receiver and resolving the number of cycles (ambiguity) of the carrier wave between the satellite and the receiver. Each receiver manufacturer implements an ambiguity solution independently.

In recent years, a topic of centimeter-level positioning using an L6 signal from QZSS (Quasi-Zenith Satellite System) satellite, has caused utilization of high-precision positioning by the carrier positioning to be expected. There are various techniques for carrier positioning. RTK-GPS (Real Time Kinematic GPS) scheme (method) (RTK-GNSS scheme (method)) achieves positioning to centimeter accuracy in real time using phase difference received by an RTK reference station whose exact location is known. In RTK-GPS (RTK-GNSS) positioning, a carrier phase observed at a receiver and an RTK reference station is measured and then an integer bias is determined. After the integer bias has been determined, a phase difference is always accumulated. That is, time error between a satellite and the receiver is eliminated by deriving double phase difference between signals received by the receiver and the RTK reference station from information of the signal received by the RTK reference station located within a few kilometers from the receiver. Carrier phase data of satellites i and j are measured by two receivers, i.e., an RTK reference station A and a receiver B. Let carrier phases from the satellite i measured by each receiver be $\varphi iA$ and $\varphi iB$ and carrier phases from the satellite j be $\varphi jA$ and $\varphi jB$. In the double phase difference between the carrier phase data $((\varphi jB-\varphi jA)-(\varphi iB-\varphi iA)=(\varphi jB-\varphi iB)-(\varphi jA-\varphi iA))$, a phase error due to a clock error within the receiver and a clock error within the satellite, a phase error due to SA (Selective Availability), and a phase error by ionosphere and troposphere are eliminated. Further, ambiguity (an integer value (integer bias) of unknown cycle count of a carrier wave from the satellite in carrier positioning) is obtained from temporal change of the double phase difference, and an exact distance between the receiver and the satellite is determined. Then, by finding a position of the receiver relative to the RTK reference station, an error caused by atmospheric factors such as ionosphere is eliminated, and the position can be obtained at high accuracy.

The receiver is needed to acquire phase information of a carrier wave from the RTK reference station, for instance, at a frequency of about once per second. Correction data transmitted from the RTK reference station to the receiver in RTK-GPS is called RTK correction data.

Currently, RTK-GPS (RTK-GNSS) is used only in highly specialized fields such as autonomous driving experiments and construction. If RTK-GPS is going to be used by many more users in future, it will be necessary to consider the following.

That is, in the case of autonomous driving experiments or at construction sites, since RTK-GPS is used in a specific limited area, it is easy to confirm in advance which RTK reference station should be employed. However, when various users utilize RTK-GPS at any locations, it is necessary to select an RTK reference station that covers a user's location.

Further, the number of receivers is relatively small in autonomous driving experiments or at construction sites and RTK-GPS users often set up their own RTK reference stations. Therefore, a load for delivery of RTK correction data has not become a problem.

However, as more receivers and applications support RTK-GPS and RTK-GPS positioning becomes generally used, a delivery load of RTK correction data is expected to become a problem. Thus, a delivery scheme (method) which can suppress or avoid an increase in a delivery load of RTK correction data will be required.

Patent Literature (PTL) 1 discloses a system that enables delivery of position correction information over a wide area at a low cost and at the same time achieves high-precision positioning in real time, by implementing in a wireless base station for mobile phones, a function as an electronic reference point (GNSS continuous observation point set up by Geospatial Information Authority of Japan) and a function of delivering position correction information, and making it possible to deliver position correction information to mobile stations in a communication network. In a method for providing position correction information disclosed in PTL 1, a part of communication bandwidth used by a mobile base station to identify a cell in which each mobile station (terminal) resides, or a part of communication bandwidth of mobile stations is fixedly allocated to provide position correction information, and data is broadcast to mobile stations in a cell area. In PTL 1, there is also description that a reference point and a mobile base station do not need to be integrated as long as the mobile base station grasps an exact absolute location of the reference point and a distance between the reference point and the mobile base station is an appropriate one. As described, in PTL 1, a mobile base station that is not integrated with a reference station always broadcasts correction information to mobile stations. As a result, a network load increases due to communication between the reference station and the mobile phone base station, imposing processing load on apparatuses in a mobile phone network.

PTL 2 discloses a configuration in which an observation center CT, a reference station X, and a plurality of positioning stations A, B, and C are connected using a telephone line so that the observation center and the reference station and positioning stations are in a one-to-many relationship. Correction data CD from the reference station is broadcast to a plurality of positioning stations through the observation center via a telephone line, and the observation center receives via the telephone line a three-dimensional position RD corrected and calculated by each positioning station based on the correction data and displays the three-dimensional position RD.

PTL 1: Japanese Unexamined Patent Application Publication No. JP-P2003-219448A
PTL 2: Japanese Unexamined Patent Application Publication No. JP-P2002-257919A

SUMMARY

As described above, code positioning is currently common. However, from now on, the number of apparatuses requiring positioning to centimeter accuracy will increase and users using RTK-GPS positioning are expected to increase. In a general RTK correction data delivery service, a receiver determines information on a coarse position thereof in some way and transmits the information to an RTK correction data delivery system. Then, the RTK correction data delivery system transmits to the receiver RTK correction data acquired by a GPS antenna corresponding to the relevant area.

In RTK-GPS (RTK-GNSS), it is necessary to perform appropriate selection of an RTK reference station neighboring to a receiver. Currently, one of the following methods is employed.

(a) User sets up his own RTK reference station to cover a positioning target area.
(b) User, for instance, manually selects an RTK reference station closest to a positioning target area from a plurality of RTK reference stations set up by others or selects one according to a GPS code positioning result.

The method (a) has a problem that a cost of setting up the RTK reference station is required, and in the method (b), it takes a time to select an RTK reference station.

In order to facilitate use of RTK-GPS (RTK-GNSS) in various areas, it is desirable to be able to quickly determine a coarse position (location) of a receiver and select an appropriate RTK reference station neighboring to the receiver.

Further, since it is necessary to continuously deliver RTK correction data received by an RTK reference station to receivers in real time, a heavy load is put on a system that delivers RTK correction data of a RTK reference station when the number of users increases. There is a possibility that the RTK correction data delivery service cannot be stably provided as a result. Therefore, a system configuration directed to load distribution is needed in consideration of an increase in the number of users (the number of GNSS positioning receivers).

It is an object of the present invention to provide a position correction information delivery system, base station, method, and program, each capable of solving the above problems.

According to an aspect of the present invention, there is provided a position correction information delivery system using a positioning scheme in which a receiver obtaining a position thereof and a reference station whose position is known measure a phase of a carrier wave from a satellite and position information of the receiver is obtained in real time based on position correction information transmitted from the reference station. The receiver transmits a request for position correction information to a first base station that manages a cell that the receiver camps on. On reception of the request from the receiver, the first base station selects a second base station having a reference station located nearby to the first base station or a reference station located nearby to the first base station, from one or more second base stations and/or one or more reference stations, registered in a database, each of the one or more second base stations having the reference station and capable of providing position correction information from the reference station, each of the one or more reference stations capable of providing position correction information, receives the position correction information from the selected second base station or reference station, and broadcasts the position correction information to the cell.

According to an aspect of the present invention, there is provided a base station constituting a position correction information delivery system using a positioning scheme in which a receiver obtaining a position thereof and a reference station whose position is known measure a phase of a carrier wave from a satellite and position information of the receiver is obtained in real time based on position correction information transmitted from the reference station. The base station includes: a processor; and a memory storing program instructions executable by the processor, wherein the processor, when executing the program instruction stored in the memory, performs processing comprising: selecting a second base station having a reference station located nearby to the base station or a reference station located nearby to the base station, from one or more second base stations and/or one or more reference stations, registered in a database, each of the one or more second base stations having the reference station and capable of providing position correction information from the reference station, each of the one or more reference stations capable of providing position correction information; and receiving the position correction information from the selected second base station or reference station and broadcasting the position correction information to the cell.

According to an aspect of the present invention, there is provided a position correction information delivery method including:

by a base station that delivers position correction information using a positioning scheme in which a receiver obtaining a position thereof and a reference station whose position is known measure a phase of a carrier wave from a satellite and position information of the receiver is obtained in real time based on position correction information transmitted from the reference station, selecting a second base station having a reference station located nearby to the base station or a reference station located nearby to the base station, from one or more second base stations and/or one or more reference stations, registered in a database, each of the one or more second base stations having the reference station and capable of providing position correction information from the reference station, each of the one or more reference stations capable of providing position correction information; and receiving the position correction information from the selected second base station or reference station and broadcasting the position correction information to the cell.

According to an aspect of the present invention, there is provided a program causing a computer, included in a base station constituting a position correction information delivery system using a positioning scheme in which a receiver obtaining a position thereof and a reference station whose position is known measure a phase of a carrier wave from a satellite and position information of the receiver is obtained in real time based on position correction information transmitted from the reference station, to execute processing comprising:

selecting a second base station having a reference station located nearby to the base station or a reference station located nearby to the base station, from one or more second base stations and/or one or more reference stations, registered in a database, each of the one or more second base stations having the reference station and capable of providing position correction information from the reference station, each of the one or more reference stations capable of providing position correction information; and receiving the position correction information from the selected second base station or reference station and broadcasting the position correction information to the cell.

According to an aspect of the present invention, there is provided a computer-readable recording medium (for instance, a semiconductor storage such as RAM (Random Access Memory), ROM (Read-Only Memory), and EEPROM (Electrically Erasable and Programmable ROM), and a non-transitory computer-readable recording medium such as HDD (Hard Disk Drive), CD (Compact Disc), and DVD (Digital Versatile Disc)) storing the program described above.

According to the present invention, in delivery of position correction information to a receiver(s) performing positioning, it becomes possible to suppress increase in network and processing loads and further suppress increase in resource and cost, due to increase in the number of the receivers.

BRIEF DESCRIPTION OF THE DRAWINGS

FIG. 4 is a diagram illustrating a base station database of the example embodiment of the present invention.

DETAILED DESCRIPTION

Example embodiments of the present invention will be described. By utilizing a mobile phone network for correction data delivery from a RTK reference station in RTK-GPS positioning, selecting an appropriate RTK reference station and having a base station broadcast RTK correction data, the present invention solves below listed problems.

Reduction of time required to select an RTK reference station.

Load distribution of RTK correction data delivery.

Figure 1:
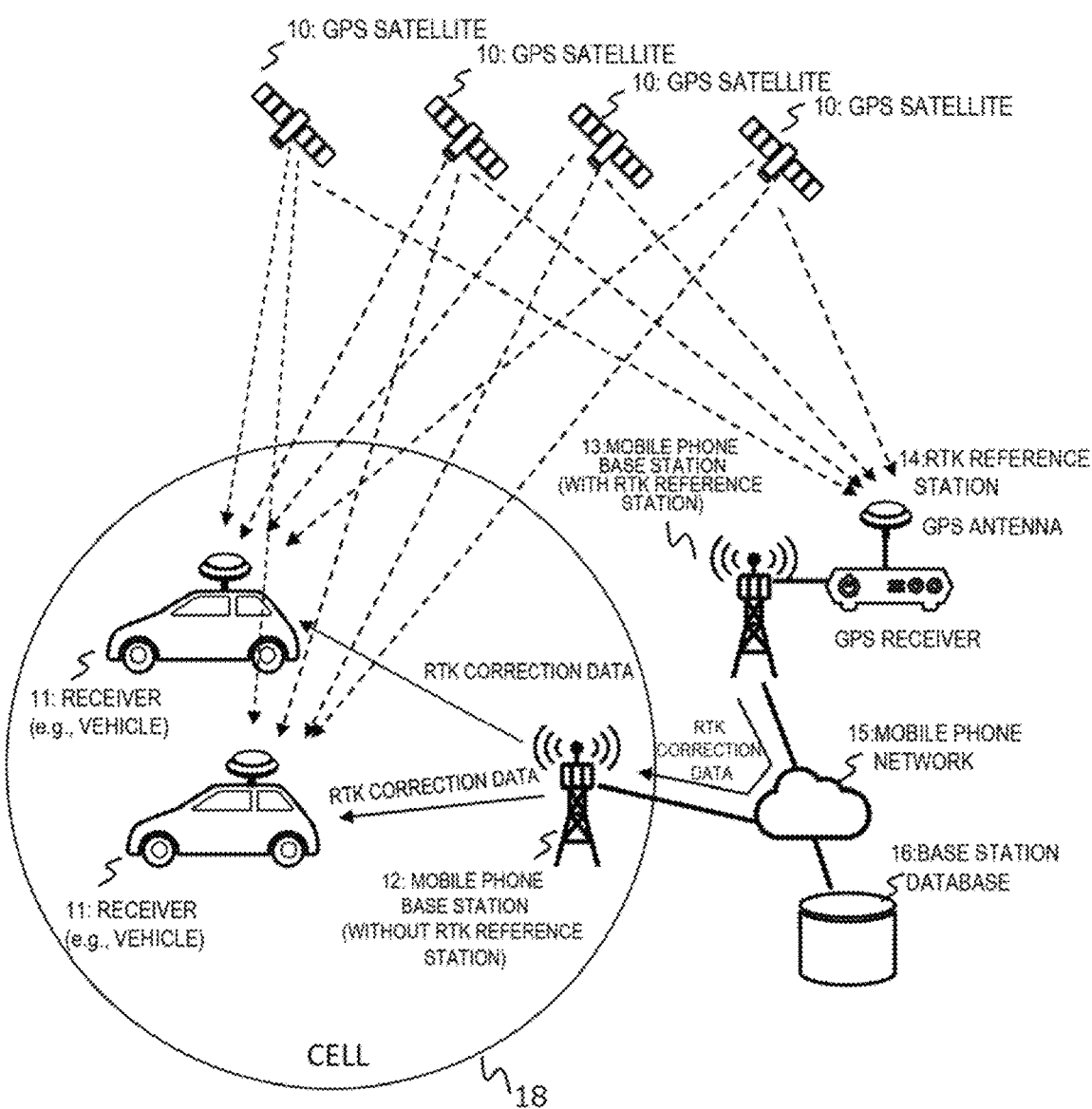
FIG. 1 is a diagram illustrating an example embodiment of the present invention.

FIG. 1 is a diagram illustrating an RTK correction data delivery system of an example embodiment of the present invention. An RTK reference station 14 whose location is known and a movable receiver 11 (positioning receiver) that measures a position simultaneously receive radio waves transmitted from GPS satellites to measure a carrier phase (phase data with a carrier wave as a unit), RTK correction data including phase data measured by the RTK reference station 14 is transmitted to the receiver 11 in real time, and the receiver 11 derives a position of the receiver 11 based on the RTK correction data in real time.

In FIG. 1, the receiver 11 camping on a mobile phone base station (no RTK reference station) without an RTK reference station transmits a RTK correction data request message to the mobile phone base station 12 (without an RTK reference station). On reception of an RTK correction data request message, the mobile phone base station 12 (without an RTK reference station) searches a base station database 16 and selects a mobile phone base station 13 (with an RTK reference station) having an RTK reference station located nearby the mobile phone base station 12 based on a search result. Registered information in the base station database 16 includes location information of mobile phone base stations, information indicating whether or not a mobile phone base station has an RTK reference station, and when it has an RTK reference station, location information thereof. Here, it is assumed that the mobile phone base station 13 (with an RTK reference station) registered in the base station database 16 is able to communicatively connect to the mobile phone base station 12 (without an RTK reference station).

The mobile phone base station 12 (without an RTK reference station) receives RTK correction data from the selected mobile phone base station 13 (with an RTK reference station) and broadcasts the RTK correction data to a cell 18 managed by the mobile phone base station 12 (without an RTK reference station).

In FIG. 1, the base station database 16 is configured to be connected to a mobile phone network 15 (core network). The base station database 16 may be provided at a data center of a mobile phone carrier and connected to a wide area network (for instance the Internet) to which the core network is connected. Note that a mobile phone base station is also simply referred to as a base station.

Figure 2A:
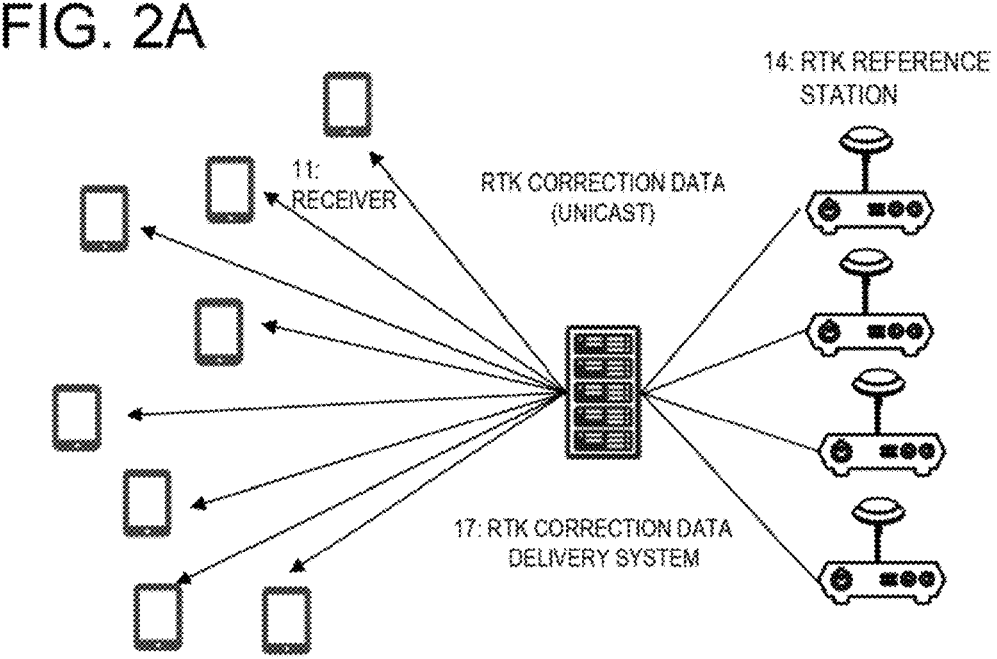
FIGS. 2A and 2B are diagrams illustrating a comparative example and the example embodiment of the present invention.

FIG. 2A is a diagram illustrating a prototype of a system that delivers RTK correction data to the receivers 11 such as smartphones. Code positioning scheme is used by a smartphone and a car navigation system, because of the reasons as follows:

RTK-GPS positioning is susceptible to influence of noise and multipath (reflected waves) since RTK-GPS positioning uses a carrier waves for measurement;
RTK-GPS positioning takes time in Initialization;
It is needed to always receive signals from four or more GPS satellites;
New initialization time is needed once signals are interrupted;
Positioning within a baseline length of 10 km is required, and positioning itself may not be possible beyond this range;
High-sensitivity antenna is expensive; and
Demand for positioning in accuracy to some cm is low.

FIG. 2A shows a prototype of an RTK correction data delivery system in which the smartphones as the receivers 11 have RTK-GPS positioning implemented therein. In FIG. 2A, the receivers 11 are smartphones, however, they may be self-driving vehicles, drones, etc.

In FIG. 2A, an appropriate RTK reference station is selected for each receiver, and RTK correction data is unicasted from the RTK correction data delivery system 17 to each receiver 11 via a network (wired network or wireless access network). As a result, a network load caused by RTK correction data delivery is high. In particular, as the number of the receivers 11 increases, a processing load and a network load of the RTK correction data delivery system 17 increase.

Figure 2B:
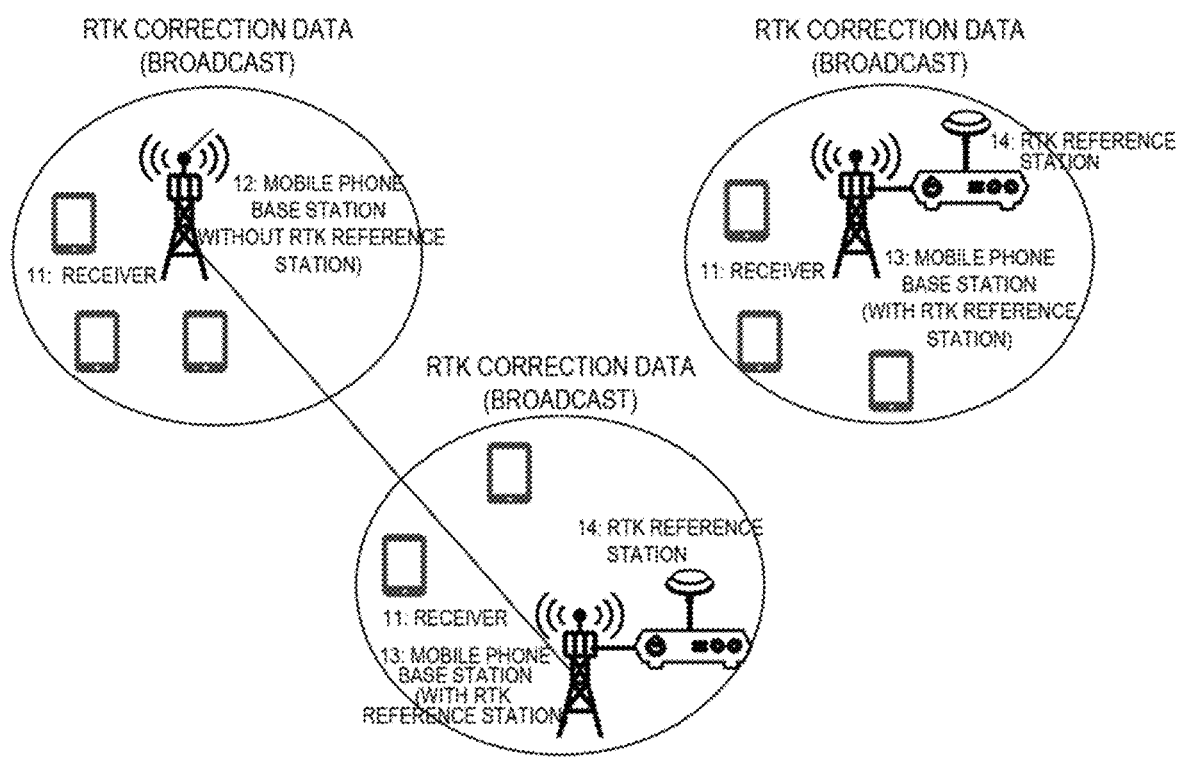

FIG. 2B is a diagram illustrating the example embodiment of the present invention. According to a system configuration in FIG. 2B, on reception of an RTK correction data request message from a receiver 11 camping on a cell of the mobile phone base station 12, the mobile phone base station 12 receives RTK correction data from the RTK reference station 14 set up in the other mobile phone base station 13 and broadcasts the data in real time. Therefore, the number of the receivers 11 receiving the RTK correction data in the cell managed by the mobile phone base station 12 does not affect a load of RTK correction data delivery.

As illustrated in FIG. 2B, the RTK reference station 14 may be set up in the mobile phone base station 13. The mobile phone base station 13 having the RTK reference station 14 broadcasts RTK correction data to a cell managed by the mobile phone base station 13.

However, if the RTK reference stations 14 are set up in all mobile phone base stations as communication facilities of the telecommunications carrier, facility costs will increase.

Therefore, in an example embodiment of the present invention, the RTK reference stations 14 may be set up in some of the mobile phone base stations 13, and the mobile phone base station 13 having the RTK reference station 14 may transmit RTK correction data of the RTK reference station 14 to the mobile phone base station 12 without an RTK reference station.

When the receiver 11 is camping on a cell managed by the mobile phone base station 12 without an RTK reference station, the receiver 11 requests RTK correction data from the mobile phone base station 12.

"Camping on" means that a user equipment (UE), searching for a cell of a selected PLMN (Public Land Mobile Network), selects a cell to provide a service (3GPP TS (Third Generation Partnership Project Technical Specification) 25.304). In this description, "camping on" also includes a state in which a receiver has performed a NAS (Non-Access Stratum) registration in the selected cell so that a service become available in the cell. In a case of EPS (Evolved Packet System), a NAS request message from a user equipment (UE) includes an attach request, etc.

Figure 3:
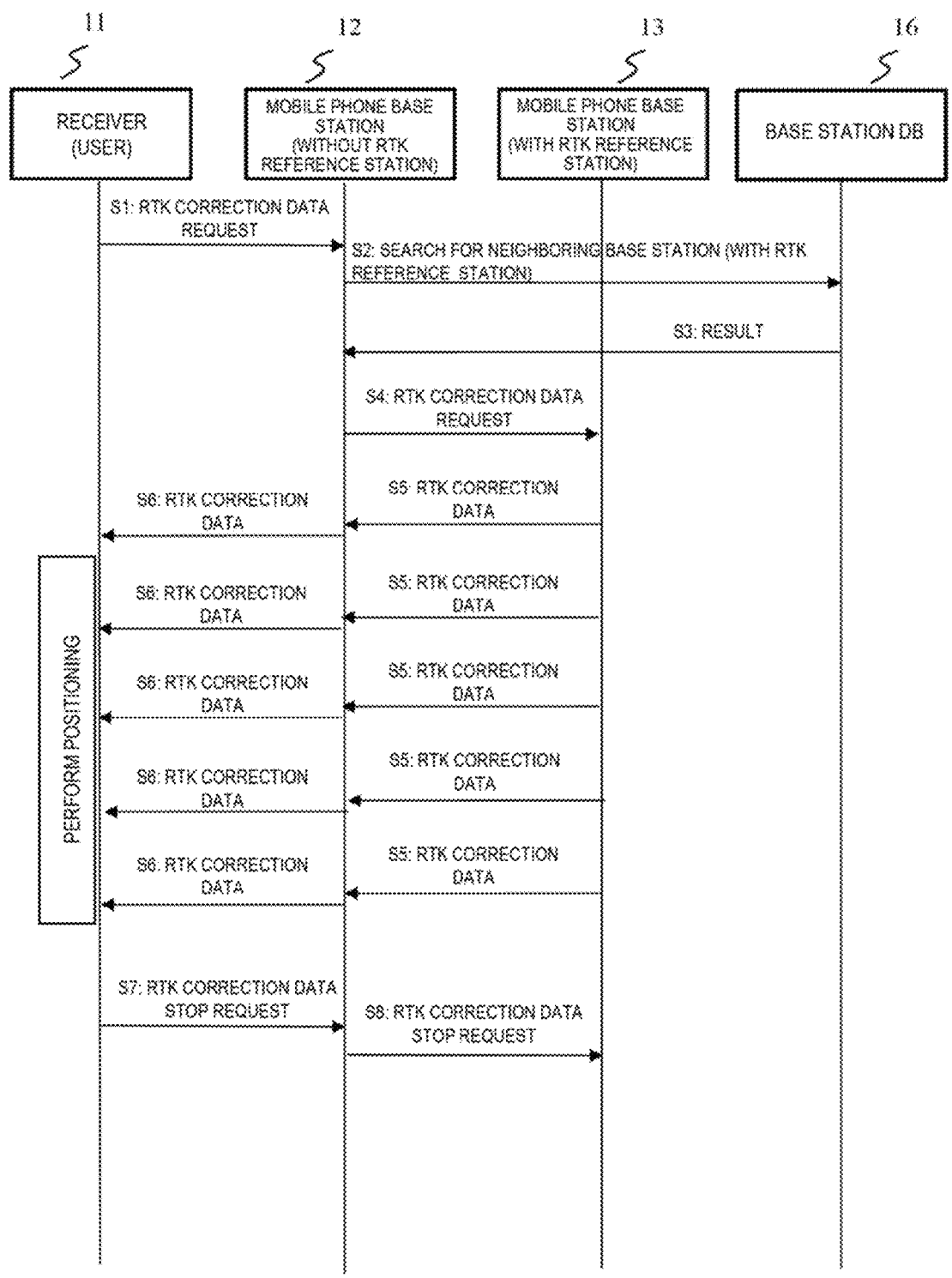
FIG. 3 is a diagram illustrating a sequence of the example embodiment of the present invention.

FIG. 3 is a diagram illustrating the operation sequence of an example embodiment of the present invention. When the receiver 11 is camping on the mobile phone base station 12 (without an RTK reference station), the receiver 11 transmits an RTK correction data request message to the mobile phone base station 12 (without an RTK reference station) (S1).

On reception of the RTK correction data request message, the mobile phone base station 12 (without an RTK reference station) searches the base station database 16 (S2) and selects the mobile phone base station 13 (with an RTK reference station) having an RTK reference station located nearby the mobile phone base station 12 based on the search result (S3). For instance, as the mobile phone base station 13 (with an RTK reference station) having an RTK reference station located nearby, the mobile phone base station 12 (without an RTK reference station) may select a mobile phone base station 13 (with an RTK reference station) having an RTK reference station so that a distance between the receiver 11 and the RTK reference station is within a range in which a desired positioning accuracy can be achieved by the receiver 11 (it is as a matter of course that the mobile phone base station 13 having the nearest RTK reference station may be selected). Further, the mobile phone base station 12 may store identification and address information of a selected mobile phone base station 13 (with an RTK reference station) and thereafter select the mobile phone base station 13 (with an RTK reference station) in response to receiving an RTK correction data request message based on information of the mobile phone base station 13 (with an RTK reference station) with identification and address information thereof stored (as long as the content of the database is not changed).

The mobile phone base station 12 (without an RTK reference station) transmits an RTK correction data request message to the mobile phone base station 13 (with an RTK reference station) (S4).

The mobile phone base station 12 (without an RTK reference station) receives RTK correction data transmitted from the mobile phone base station 13 (with an RTK reference station) (S5) and broadcasts the RTK correction data to the cell managed by the mobile phone base station 12 (without an RTK reference station) (S6). The RTK correction data is broadcast at a preset time interval (for instance, one second) according to specification or the like of the RTK reference station. The mobile phone base station 13 (with an RTK reference station) may not have a fixed time interval for the RTK correction data broadcast, but select one out of several time intervals based on information of the receiver 11 without.

The receiver 11 receives the broadcast RTK correction data and performs RTK-GPS positioning.

When finishing RTK-GPS positioning, the receiver 11 transmits an RTK correction data stop request message to the mobile phone base station 12 (without an RTK reference station) (S7).

The mobile phone base station 12 (without an RTK reference station) transmits an RTK correction data stop request message to the mobile phone base station 13 (with an RTK reference station) (S8) when the mobile phone base station 12 (without an RTK reference station) receives RTK correction data stop request messages from all of the receivers 11 that have transmitted an RTK correction data request messages to the mobile phone base station 12 (without an RTK reference station), out of receivers camping on the cell managed by the mobile phone base station 12 (without an RTK reference station). The mobile phone base station 13 (with an RTK reference station) stops transmitting the RTK correction data to the mobile phone base station 12 (without an RTK reference station). The mobile phone base station 12 (without an RTK reference station) stops broadcasting the RTK correction data.

When the mobile phone base station 12 (without an RTK reference station) is not currently broadcasting RTK correction data and receives an RTK correction data request message from a first receiver out of the receivers 11 camping on the cell managed by the mobile phone base station 12 (without an RTK reference station), the mobile phone base station 12 (without an RTK reference station) selects a mobile phone base station 13 (with an RTK reference station) having an RTK reference station, obtains RTK correction data from the mobile phone base station 13 (with an RTK reference station), and starts broadcasting the data to the cell of the mobile phone base station 12 (without an RTK reference station). When a second receiver 11 camps on the cell managed by the mobile phone base station 12 (without an RTK reference station), the cell is already receiving the broadcast of the RTK correction data from the mobile phone base station 12 (without an RTK reference station). In this case, when the second receiver 11 performs RTK-GPS positioning, the second receiver 11 may transmit an RTK correction data request message to the mobile phone base station 12 (without an RTK reference station).

If the second receiver 11 does not transmit an RTK correction data request message to the mobile phone base station 12 (without an RTK reference station), the cell of the mobile phone base station 12 (without an RTK reference station) may not have any receiver 11 left that has requested RTK correction data after the first receiver transmits an RTK correction data stop request message to the mobile phone base station 12 (without an RTK reference station) after finishing RTK-GPS positioning. In this case, the mobile phone base station 12 (without an RTK reference station) stops broadcasting RTK correction data. Then, the second receiver 11, which has hitherto been receiving RTK correction data, will not be able to receive the RTK correction data anymore. This is why the second receiver 11 transmits an RTK correction data request message.

The mobile phone base station 12 (without an RTK reference station) may include a storage unit which manages a receiver(s) 11 transmitting RTK correction data request messages along with terminal identification information thereof (for instance, IMEI (International Mobile Equipment Identity), etc.) as reception target receivers of RTK correction data, and may also delete from the storage unit the terminal identification information of a receiver 11 that has transmitted an RTK correction data stop request message.

FIG. 4 is a diagram illustrating an example of the base station database 16. Information such as a location of a base station and whether or not the base station has an RTK reference station is registered in the base station database 16 in advance. A type of the station indicates whether a base station or an RTK reference station. A base station entry includes information such as cell identification information (cell ID), an antenna location (base station antenna for a wireless access network), whether or not the base station has an RTK reference station, and location information of the RTK reference station if the base station has the RTK reference station. Further, an RTK reference station entry includes location information of the RTK reference station. This RTK reference station can connect to the mobile phone base station 12 (without an RTK reference station) via a mobile network (core network), IP (Internet Protocol) network, etc. When the RTK reference station can be accessed via an IP network, etc., the base station database 16 may be configured to include IP address information of the RTK reference station. The mobile phone base station 12 (without an RTK reference station) may store a copy of the information in the base station database 16 in a memory or the like thereof. The mobile phone base station 12 (without an RTK reference station) may also store information of the mobile phone base station 13 (with an RTK reference station) selected as an RTK correction data source in a memory or the like thereof.

Figure 5:
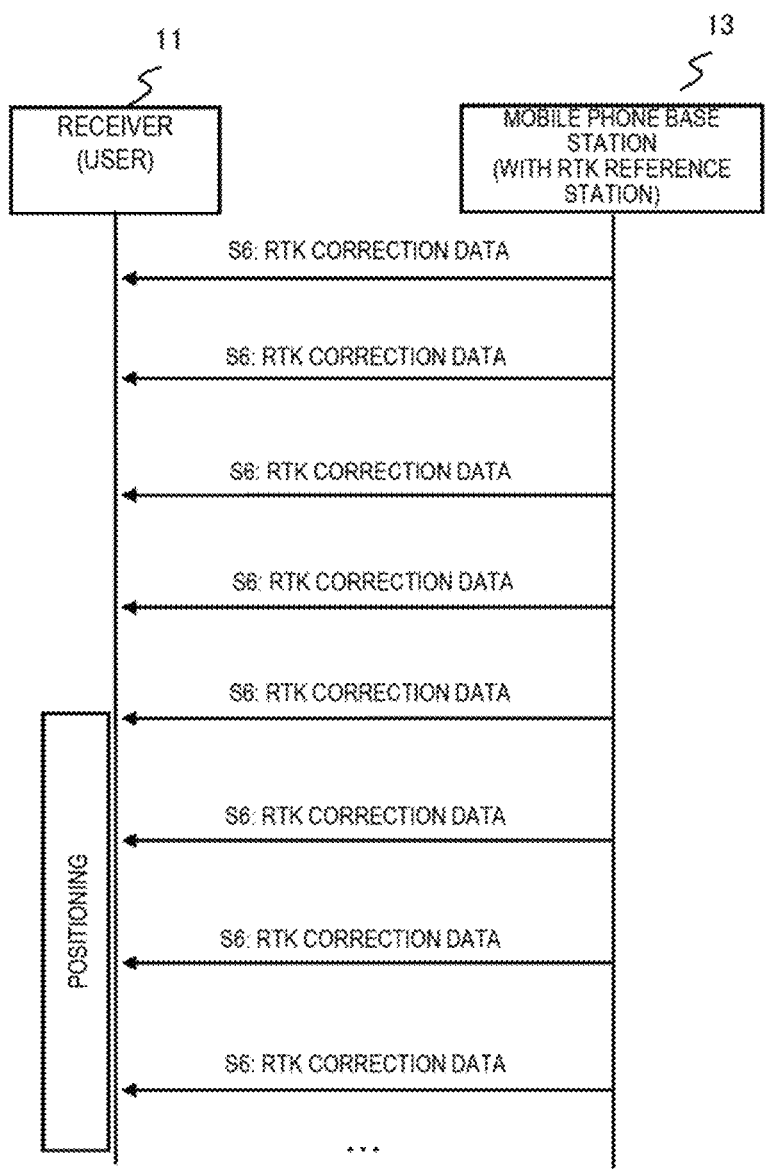
FIG. 5 is a diagram illustrating a sequence of the example embodiment of the present invention.

FIG. 5 is a diagram illustrating an example of an RTK correction data transmission sequence between the receiver 11 and the mobile phone base station 13 (with an RTK reference station) that has an RTK reference station. In the example of FIG. 5, the mobile phone base station 13 with an RTK reference station broadcasts RTK correction data at a constant time interval (S6). The mobile phone base station 13 broadcasts RTK correction data at a constant time interval even after the receiver 11 performs positioning. All receivers within a cell area of the RTK reference station can obtain RTK correction data which the mobile phone base station transmits using broadcast instead of one-to-one communication (unicast communication).

As with the mobile phone base station 12 (without an RTK reference station), the mobile phone base station 13 (with an RTK reference station) that has an RTK reference station may broadcast RTK correction data on reception of an RTK correction data request message from the receiver 11. This enables the receiver 11 to make processing common for the mobile phone base station 12 (without an RTK reference station) and the mobile phone base station 13 (with an RTK reference station). That is, when the receiver 11 camping on a cell managed by the mobile phone base station 13 (with an RTK reference station) requests RTK correction data, the receiver 11 may transmit an RTK correction data request message to the mobile phone base station 13 (with an RTK reference station). On reception of the RTK correction data request message, the mobile phone base station 13 (with an RTK reference station) may broadcast RTK correction data as long as at least one receiver 11 that has transmitted an RTK correction data request message is camping on a cell of the mobile phone base station 13 (with an RTK reference station). After finishing RTK-GPS positioning, the receiver 11 may transmit an RTK correction data stop request message to the mobile phone base station 13 (with an RTK reference station). On reception of the RTK correction data stop request message, the mobile phone base station 13 (with an RTK reference station) may stop broadcasting the RTK correction data, when there is left no receiver 11 that camps on the cell and has transmitted an RTK correction data request message, in the cell. On reception of an RTK correction data request message, the mobile phone base station 13 (with an RTK reference station) broadcasts RTK correction data from the RTK reference station 14 included in the mobile phone base station 13 to the cell of the mobile phone base station 13 (with an RTK reference station) without referring to the base station database 16.

Figure 6:
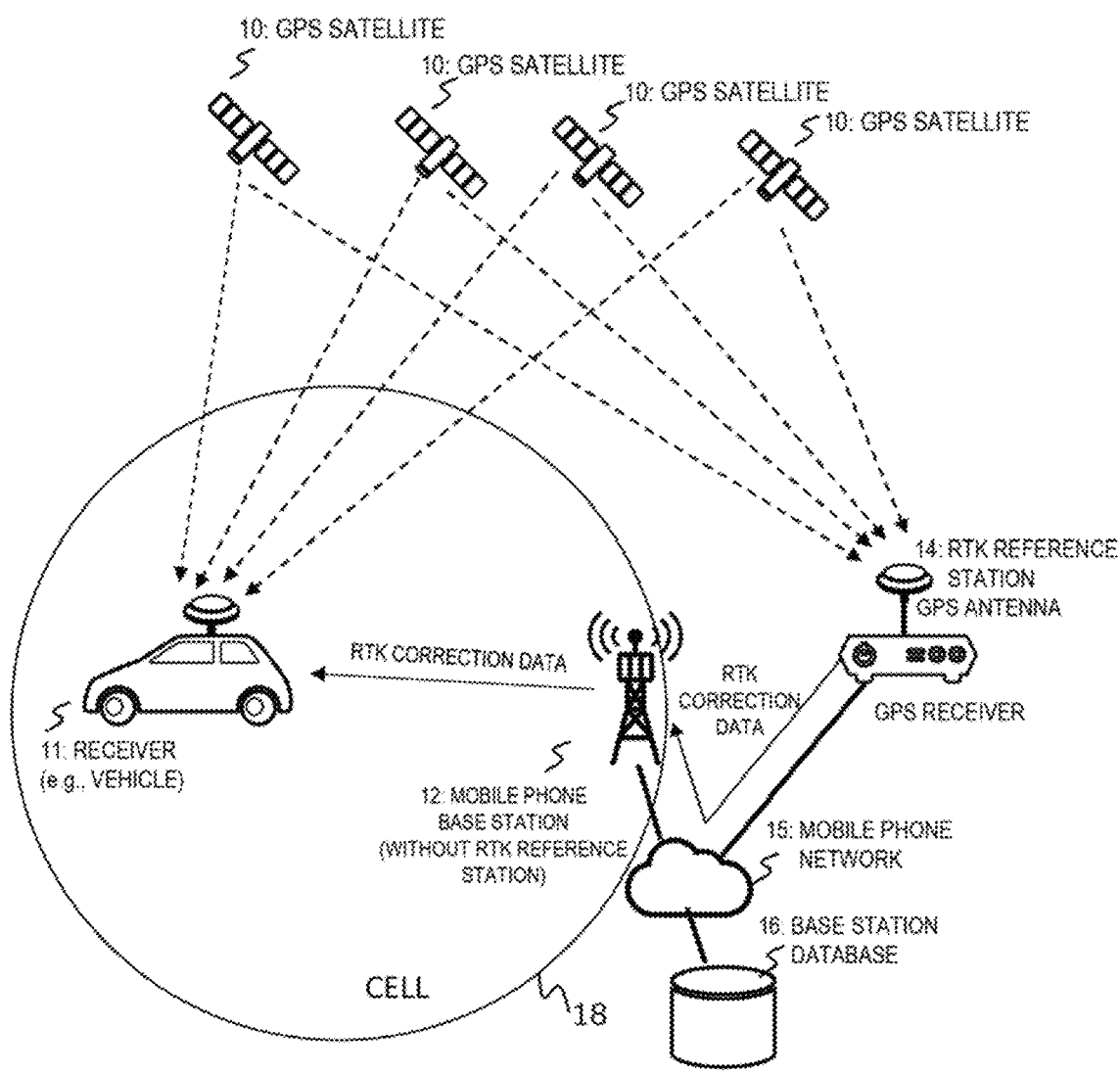
FIG. 6 is a diagram illustrating a variation of the example embodiment of the present invention.

FIG. 6 is a diagram illustrating another example of an example embodiment of the present invention. In the example of FIG. 6, the RTK reference station 14 is connected to the mobile phone base station 12 (without an RTK reference station) via a network. The RTK reference station 14 may be provided at a location other than a mobile phone base station. It is noted that some mobile phone base stations are equipped with GPS antennas for managing time synchronization based on time information from GPS satellites. In this case, by utilizing a GPS antenna already installed in a mobile phone base station as an RTK reference station, equipment to be added can be minimized.

When using an RTK reference station 14 installed at a location other than a mobile phone base station, the mobile phone base station 12 (without an RTK reference station) not having an RTK reference station requests RTK correction data to the RTK reference station 14 to obtain the RTK correction data therefrom. As illustrated in FIG. 4, RTK reference stations installed at locations other than mobile phone base stations are registered in the base station database 16. In the base station database 16, information about RTK reference stations installed at locations other than mobile phone base stations and information about mobile phone base stations may be separated and stored in different tables.

A range covered by one RTK reference station is about several kilometers. If the receiver 11 is within a few kilometers from an RTK reference station, the receiver 11 can achieve positioning to a desired accuracy. When a size of a cell of a mobile phone base station is larger than a coverage area of an RTK reference station and a receiver requests RTK correction data from the mobile phone base station, the receiver may be out of coverage of the RTK reference station and may not be able to use the RTK correction data. A cell size of a mobile phone base station with a GPS antenna installed is configured to be smaller than a coverage area of an RTK reference station. In FIG. 6, although the RTK reference station 14 is connected to the mobile phone base station 12 (without an RTK reference station) via a mobile phone network 15 however, the RTK reference station 14 may, as a matter of course, be connected to the mobile phone base station 12 (without an RTK reference station) via a different network.

Figure 7:
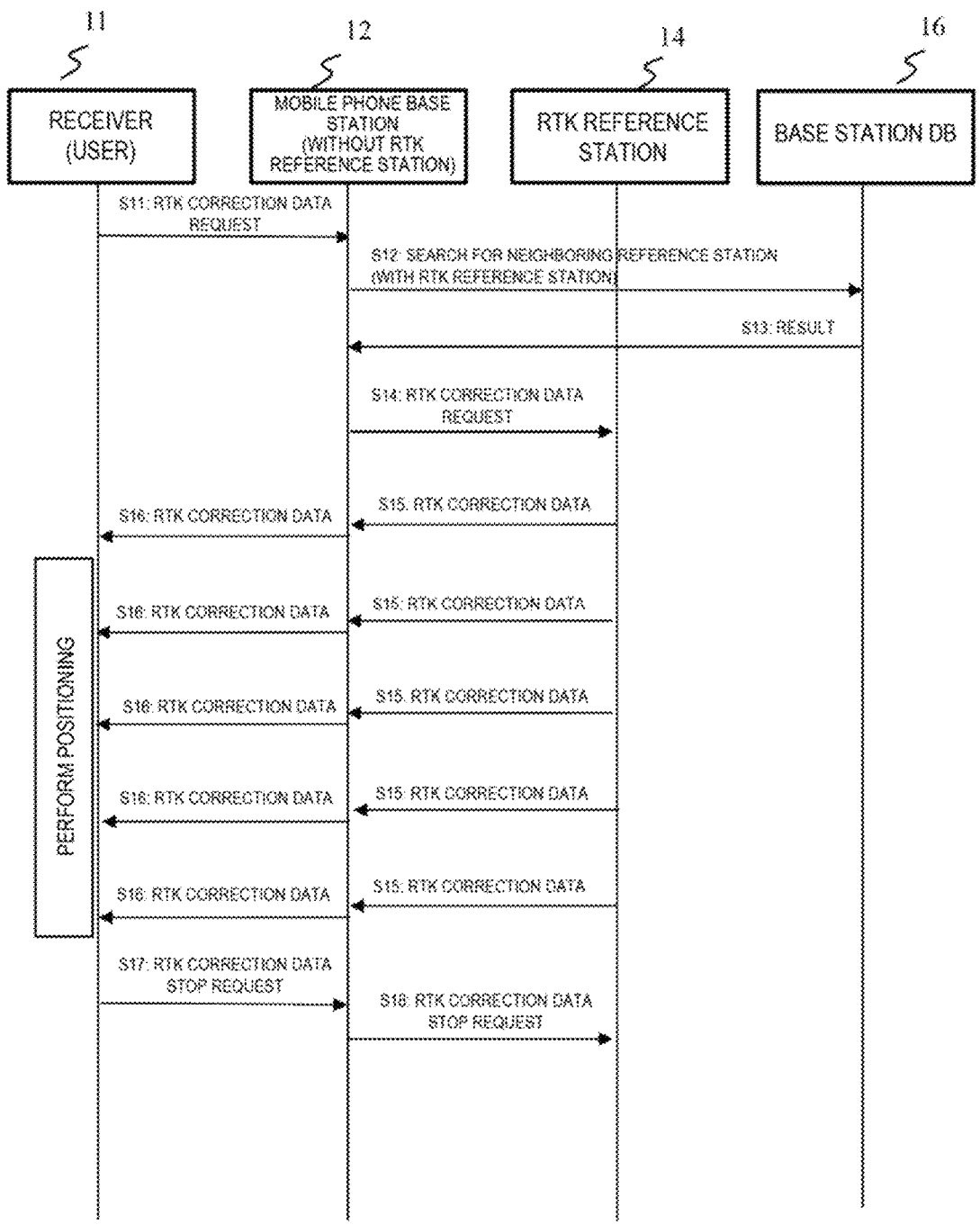
FIG. 7 is a diagram illustrating a sequence of the variation of the example embodiment of the present invention.

FIG. 7 is a diagram illustrating a sequence of an example embodiment of the present invention. When the receiver 11 is camping on the mobile phone base station 12 (without an RTK reference station), the receiver 11 transmits an RTK correction data request message to the mobile phone base station 12 (without an RTK reference station) (S11). On reception of the RTK correction data request message, the mobile phone base station 12 (without an RTK reference station) refers to the base station database 16 and searches for an RTK reference station 14 located nearby the mobile phone base station 12 (without an RTK reference station) (S12).

The mobile phone base station 12 (without an RTK reference station) selects an RTK reference station 14 installed at a location other than a mobile phone base station based on the search results (S13) and transmits an RTK correction data request message to the RTK reference station 14 (S14).

The mobile phone base station 12 (without an RTK reference station) obtains RTK correction data from the RTK reference station 14 (S15) and broadcasts the RTK correction data to the cell (managed by the mobile phone base station 12) on which the receiver 11 camps (S16). The receiver 11 receives the broadcast RTK correction data and performs RTK-GPS positioning.

When finishing RTK-GPS positioning, the receiver 11 transmits an RTK correction data stop request message to the mobile phone base station 12 (without an RTK reference station) (S17).

The mobile phone base station 12 (without an RTK reference station) transmits an RTK correction data stop request message to the RTK reference station 14 (S18) and stops broadcasting the RTK correction data when the mobile phone base station 12 (without an RTK reference station) receives an RTK correction data stop request message from all of the receivers 11 that have transmitted an RTK correction data request message to the mobile phone base station 12 (without an RTK reference station), out of receivers camping on the cell managed by the mobile phone base station 12 (without an RTK reference station).

In the present example embodiment, when broadcasting RTK correction data, the mobile phone base stations 12 and 13 may store the RTK correction data in a field that is expandable in an existing broadcast signal.

For instance, an existing CBS (Cell Broadcast Service) broadcast transmission can be used (3GPP TS 25.324). CBS uses a CTCH (Common Traffic Channel). CTCH is a unidirectional channel from a base station to a terminal, and data is unilaterally transmitted to all terminals in the cell of the base station at a constant interval. In the present example embodiment, an information element Message Type (which describes a source and a type of a CB (Cell Broadcast) Message) is assigned for RTK correction data in CTCH transmission. The correction data is stored in CB Data (broadcast CB information) and broadcast. Only a standby terminal can receive CBS, and a communicating terminal cannot receive CBS in a call. However, a delivery probability is increased by repeated broadcasting of RTK correction data by the mobile phone base station.

Alternatively, as a new signal dedicated to RTK correction data broadcasting, a dedicated channel for use of broadcasting RTK correction data may be newly defined aside from CTCH.

In the present example embodiment, a redundant configuration, in which an area covered by one RTK reference station is also covered by at least another RTK reference station, may be employed as a measure against temporal unavailability of an RTK reference station or mobile phone base station due to failure or maintenance thereof. In this case, even when the RTK reference station in one area becomes unavailable, another RTK reference station can cover the area and thus an occurrence of an area where the RTK reference station cannot be utilized.

In the present example embodiment, when the receiver 11 moves and performs a handover between base stations, a mobile phone base station of a handover destination takes over delivery of RTK correction data.

For instance, when the receiver 11 receiving RTK correction data and performing positioning after requesting RTK correction data to a mobile phone base station, performs handover to a neighboring base station (handover between base stations), information indicating that the receiver 11 is currently receiving RTK correction data is included in information of the terminal (receiver 11) exchanged via X2 interface between a handover source mobile phone base station (source base station) and a handover destination mobile phone base station (destination base station). This allows the handover destination mobile phone base station (destination base station) to take over the RTK correction data broadcasting.

In this case, when the receiver 11 that performs the handover is a first receiver that requires RTK correction data among receivers camping on the cell of the handover destination mobile phone base station, the destination base station refers the base station database 16 and selects a circumjacent (neighboring) mobile phone base station having an RTK reference station (or selects a RTK reference station) from mobile phone base stations having an RTK reference station (or from RTK reference stations). The handover destination mobile phone base station obtains RTK correction data from the selected mobile phone base station (or RTK reference station). The handover source mobile phone base station stops broadcasting the RTK correction data if no receiver among ones that is camping on the cell of the source base station and has requested RTK correction data, as a result of the handover of the receiver performing RTK-GPS positioning.

Figure 8:
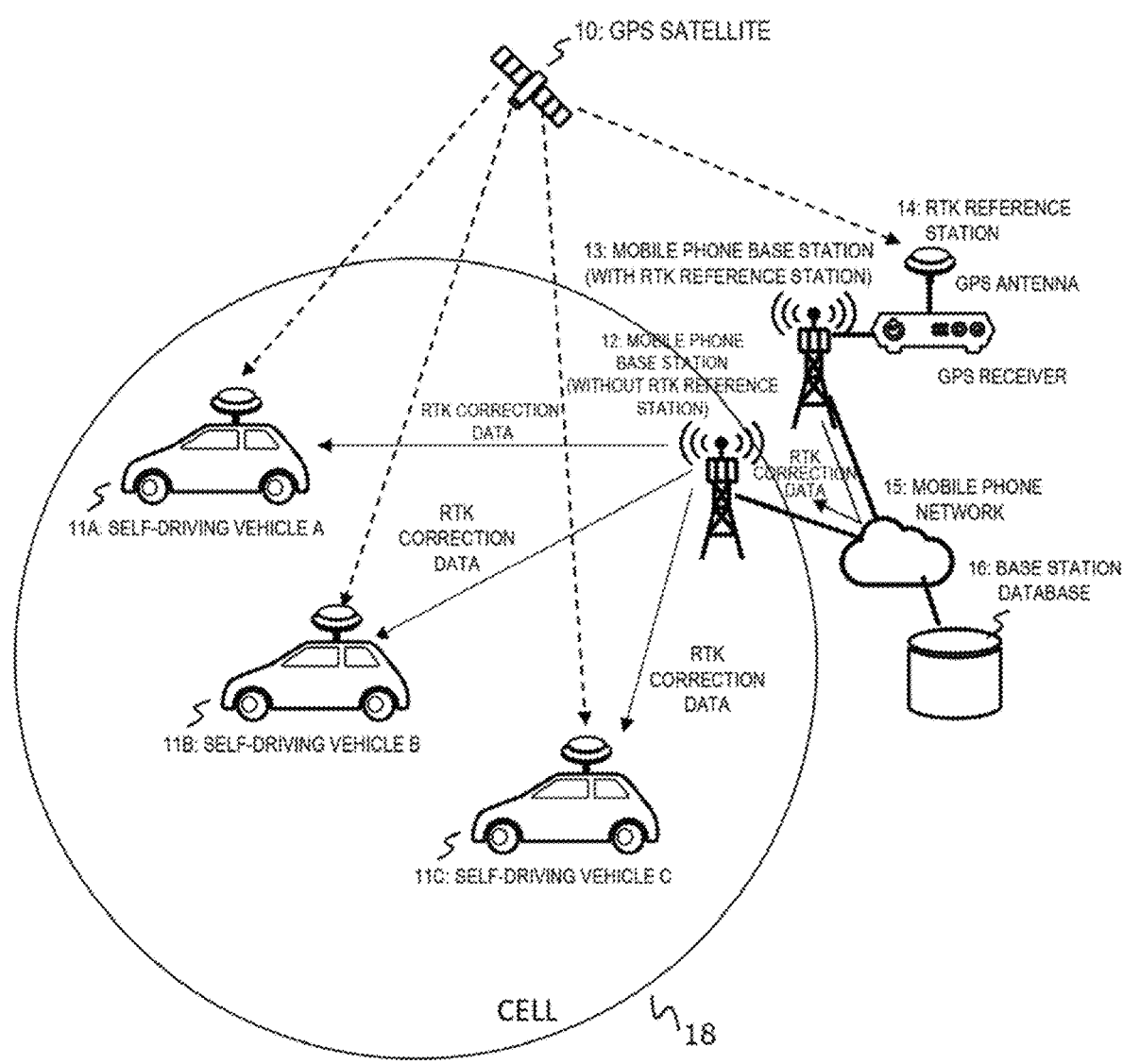
FIG. 8 is a diagram illustrating the example embodiment of the present invention.

Next, as a specific example of the embodiment of the present invention, FIG. 8 illustrates an application example of the present invention to autonomous vehicle driving. FIG. 8 illustrates only one GPS satellite 10 for simplicity. Since it is necessary to identify roads and lanes in autonomous driving, a positioning accuracy of normal code positioning (single-point positioning) may be insufficient. Therefore, RTK-GPS positioning using carrier waves is expected to be used. In an RTK correction data delivery system with a scheme in which each vehicle individually makes an RTK-GPS request, since it is needed to individually deliver RTK correction data to each vehicle, a load will increase with an increase of the number of self-driving vehicles using RTK-GPS positioning (refer to FIG. 2A).

In FIG. 8, self-driving vehicles 11A, 11B, and 11C camp on the mobile phone base station 12 (without an RTK reference station). The self-driving vehicles 11A, 11B, and 11C perform RTK-GPS positioning using RTK correction data broadcasted from the mobile phone base station 12 (without an RTK reference station) to the cell 18. The mobile phone base station 12 (without an RTK reference station) receives the RTK correction data from the mobile phone base station 13 that has the RTK reference station 14.

According to the example embodiment of the present invention, a load caused by an increase in the number of vehicles is reduced by a scheme which performs broadcasting of RTK correction data by utilizing a mobile phone base station.

Figure 9:
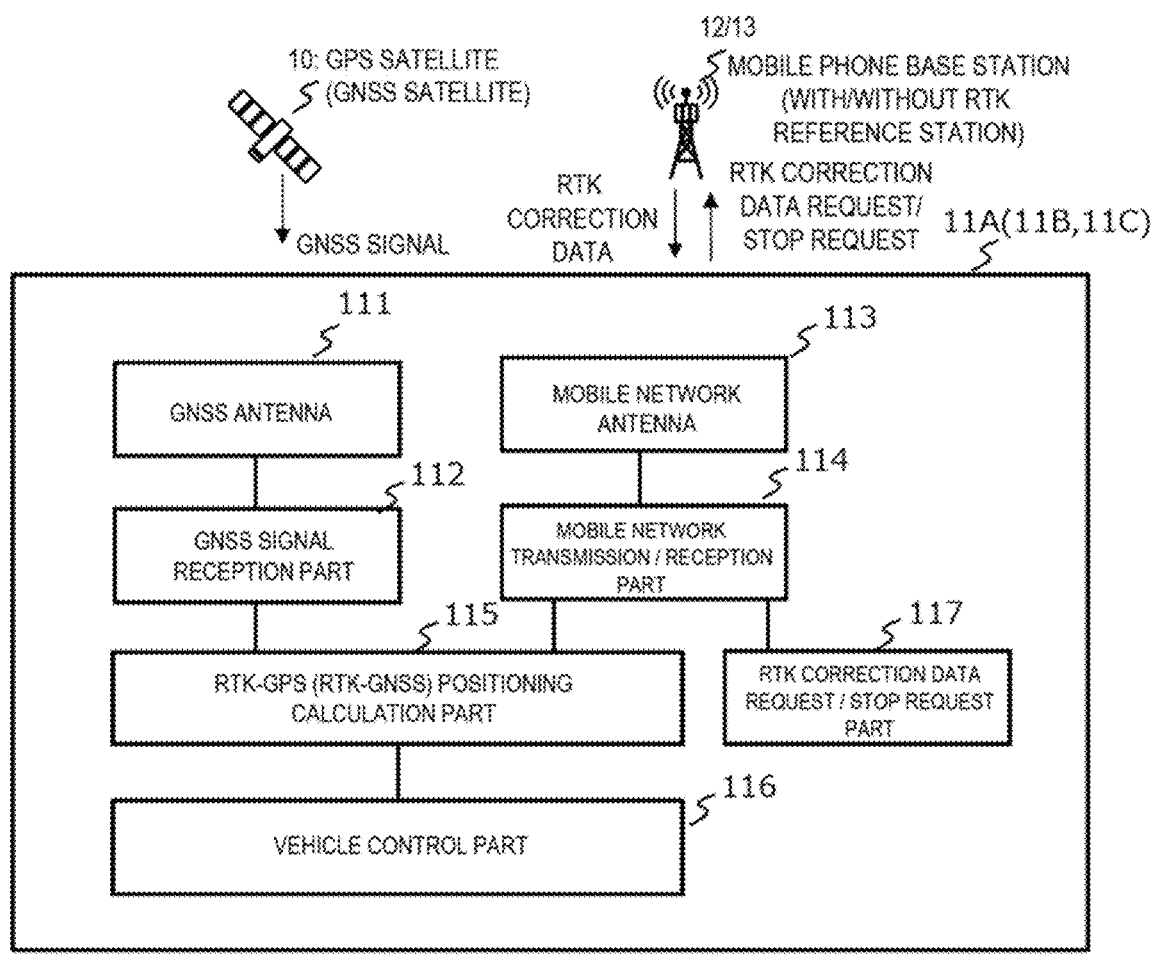
FIG. 9 is a diagram illustrating a receiver of the example embodiment of the present invention.

FIG. 9 is a diagram illustrating RTK-GPS positioning related function blocks of the self-driving vehicles 11A, 11B, and 11C illustrated in FIG. 8. The self-driving vehicles 11A, 11B, and 11C camp on the mobile phone base station 12. Each of the self-driving vehicles 11A, 11B, and 11C performs RTK-GPS positioning using RTK correction data broadcasted by the mobile phone base station 12. FIG. 9 illustrates the self-driving vehicle 11A. The self-driving vehicles 11B and 11C have the same configuration as the self-driving vehicle 11A illustrated in FIG. 9.

The self-driving vehicle 11A includes a GNSS antenna 111 that receives a GNSS signal from a GPS satellite (GNSS satellite), a GNSS signal reception part 112 that demodulates the received GNSS signal, a mobile network antenna 113 that wirelessly communicates with a base station, a mobile network transmission/reception part 114 that transmits/receives a signal to/from a base station, an RTK-GPS (RTK-GNSS) positioning calculation part 115 that calculates position information of the vehicle 11A based on the received GNSS signal and RTK correction data, a vehicle control part 116 that controls the movement of the vehicle 11A based on the position information, and an RTK correction data request/stop request part 117 that makes an RTK correction data request and RTK correction data stop request.

Figure 10:
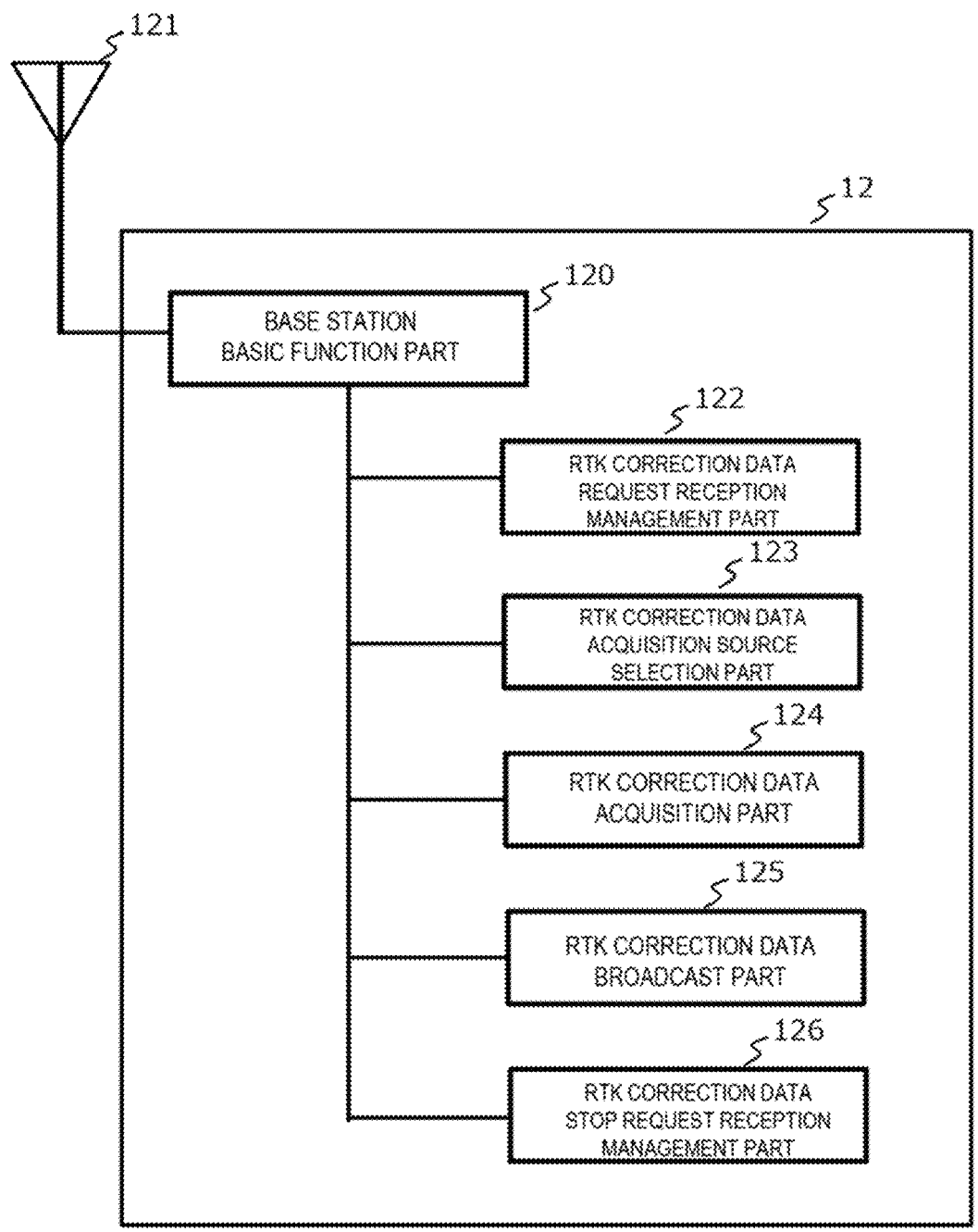
FIG. 10 is a diagram illustrating a mobile phone base station of the example embodiment of the present invention.

FIG. 10 is a diagram illustrating a configuration example of the mobile phone base station 12 without an RTK reference station. A base station basic function part 120 of the mobile phone base station 12 (without an RTK reference station) includes basic functions of a mobile phone base station (antenna, wireless transmission/reception part, baseband processing part, communication control part, etc.), manages wireless resources, and communicates with another base station and a core network.

From the base station basic function part 120, an RTK correction data request reception management part 122 receives an RTK correction data request from the receiver 11 that has performed registration in a mobile phone network (core network) by an attach request, etc. On reception of an RTK correction data request message from a receiver 11, the RTK correction data request reception management part 122 may register terminal identification information of the receiver 11 in a storage part not illustrated. When the RTK correction data request reception management part 122 is not currently broadcasting RTK correction data (the storage part does not store the terminal identification information of any receiver 11 that has transmitted an RTK correction data request) and receives an RTK correction data request message from a new receiver 11, the RTK correction data request reception management part 122 instructs an RTK correction data acquisition source selection part 123 to select a suitable mobile phone base station 13 (or RTK reference station 14) as the RTK correction data acquisition source.

When the RTK correction data request reception management part 122 is currently broadcasting RTK correction data (the storage part stores the terminal identification information of at least one receiver 11 that has transmitted an RTK correction data request) and receives an RTK correction data request from a new receiver 11, the RTK correction data request reception management part 122 registers the terminal identification information of this new receiver 11 in the storage part not illustrated in the drawing (without instructing the RTK correction data acquisition source selection part 123 to select an RTK correction data acquisition source).

On reception of the instruction to select an RTK correction data acquisition source, the RTK correction data acquisition source selection part 123 refers to the base station database 16 and selects the closest mobile phone base station 13 (with an RTK reference station) or RTK reference station 14 among mobile phone base stations 13 having an RTK reference station (or RTK reference stations 14). When the RTK correction data acquisition source selection part 123 already stores a selected mobile phone base station 13 (with an RTK reference station) or RTK reference station 14, the RTK correction data acquisition source selection part 123 may use the stored mobile phone base station 13 (with an RTK reference station) or RTK reference station 14.

An RTK correction data acquisition part 124 transmits an RTK correction data request message to the selected mobile phone base station 13 (with an RTK reference station) and receives RTK correction data transmitted from the mobile phone base station 13 (with an RTK reference station). An RTK correction data broadcast part 125 sets up the RTK correction data in, for instance, CB (Cell Broadcast) data, which is broadcasted from the base station basic function part 120.

On reception of an RTK correction data stop request message from a receiver 11 via the base station basic function part 120, an RTK correction data stop request reception management part 126 refers to the storage part storing the terminal identification information of the receiver 11 that has transmitted an RTK correction data request to confirm whether or not the terminal identification information of the receiver 11 that transmitted the RTK correction data stop request is stored. If it is, the RTK correction data stop request reception management part 126 deletes the identification information from the storage part. If the storage part does not store the terminal identification information of any receiver 11 that has transmitted an RTK correction data request, the RTK correction data stop request reception management part 126 transmits an RTK correction data stop request message to the selected mobile phone base station 13 having an RTK reference station. As a result, the RTK correction data broadcast part 125 stops broadcasting RTK correction data.

The RTK correction data request reception management part 122 is configured to manage terminal identification information of the receiver 11 that has transmitted an RTK correction data request in the storage part, but the RTK correction data request reception management part 122 may count the number of the receivers 11 that have transmitted an RTK correction data request. The count may be increased by one when an RTK correction data request is received from the receiver 11 while the count may be decreased by one when an RTK correction data stop request is received from the receiver 11. When the count is at least one, RTK correction data may be broadcasted, and the broadcast delivery may be stopped when the count is zero.

The mobile phone base station 13 (with an RTK reference station) may be without the RTK correction data acquisition source selection part 123 of FIG. 10 and configured to have the RTK correction data acquisition part 124 obtain RTK correction data from the RTK reference station 14 in the mobile phone base station 13 (with an RTK reference station). In the mobile phone base station 13 (with an RTK reference station), the RTK correction data acquisition part 124 may transmit RTK correction data from the RTK reference station 14 in the mobile phone base station 13 (with an RTK reference station) to the mobile phone base station 12 (without an RTK reference station) when the RTK correction data request reception management part 122 receives an RTK correction data request message from the mobile phone base station 12 (without an RTK reference station). In the mobile phone base station 13 (with an RTK reference station), transmission of the RTK correction data from the RTK reference station 14 included in the mobile phone base station 13 (with an RTK reference station) to the mobile phone base station 12 (without an RTK reference station) may be stopped when the RTK correction data stop request reception management part 126 receives an RTK correction data stop request message from the mobile phone base station 12 (without an RTK reference station).

Figure 11:
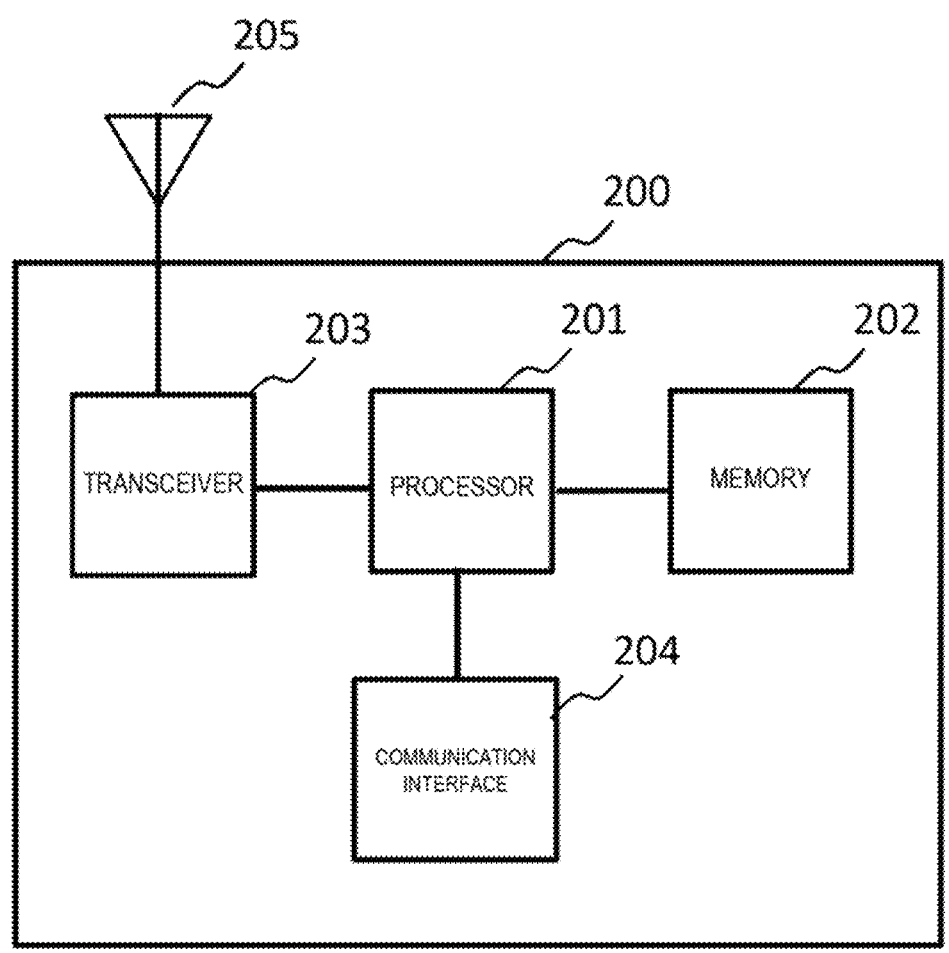
FIG. 11 is a diagram illustrating the example embodiment of the present invention.

FIG. 11 is a diagram illustrating an example in which the mobile phone base station 12 (without an RTK reference station) is constituted by a computer system 200. The computer system 200 includes a processor 201, a memory 202, a transceiver 203, and a communication interface 204. The memory 202 may be configured to include at least one of RAM, ROM, EEPROM, HDD, and so forth. The transceiver 203 transmits a signal from an antenna 205 and receives a signal from the antenna 205. The communication interface 204 communicatively connects with a core network node, other mobile phone base stations 12 (without an RTK reference station), and the base station database 16, and further communicative connects with the mobile phone base station 13 (with an RTK reference station) and the RTK reference station 14 to receive RTK correction data. The processor 201 functions as a mobile phone base station of the example embodiment described above by executing a program stored in the memory 202.

In the related technology, it takes about 30 seconds to one minute to perform single-point positioning using a C/A code, in order to select an appropriate RTK reference station that covers an area where RTK-GPS is used, from a plurality of RTK reference stations set up by a third party. After the single-point positioning using a C/A code is completed, an RTK reference station that covers the location is selected.

According to the present example embodiment, it is possible to select an RTK reference station more quickly than the related technology. When a receiver is camping on a mobile phone base station 12 without an RTK reference station, the mobile phone base station needs to search for a mobile phone base station 13 having an RTK reference station located nearby (for instance, within 10 km) in the base station database 16 and request RTK correction data. A time required for the search and RTK correction data acquisition is sufficiently shorter than the time required for single-point positioning using a C/A code in the related technology.

In the prototype (related technology) described with reference to FIG. 2A, in response to an RTK correction data request from each receiver, RTK correction data obtained from an RTK reference station corresponding to an area of each receiver is unicasted to each receiver. As a result, a load on the RTK correction data delivery system increases in proportion to the number of receivers.

In contrast, according to the present example embodiment, each mobile phone base station performs broadcast delivery of RTK correction data to a plurality of receivers using broadcast. As a result, a load of RTK correction data delivery in the mobile phone base station is not affected by the number of receivers.

In each example embodiment described above, a base station and a network delivering RTK correction data to receivers are not limited to a mobile phone base station and mobile phone network of a mobile network operator (MNO) and may be communication facilities provided by a mobile virtual network operator (MVNO). The base station delivering RTK correction data to receivers may, as a matter of course, be an access point in a wireless LAN. A virtual reference point that virtually creates a reference point in a vicinity of a positioning site from an electronic reference point or observation data in a plurality of electronic reference points may be used as the RTK reference station.

Each disclosure of Patent Literatures 1 and 2 cited above is incorporated herein in its entirety by reference thereto and can be used as a basis or a part of the present invention as necessary. Modification and adjustment of each embodiment or each example are possible within the scope of the overall disclosure (including the claims) of the present invention and based on the basic technical concept of the present invention. Various combinations and selections of various disclosed elements (including each element in each claim, each element in each example, each element in each drawing, and so on) are possible within the scope of the claims of the present invention. That is, the present invention naturally includes various variations and modifications that could be made by those skilled in the art according to the overall disclosure including the claims and the technical concept. Further, using some or all of the disclosure in the literatures cited above as necessary, in combination with the matters described herein, as part of the disclosure of the present invention in accordance with the object of the present invention, shall be deemed to be included in the disclosed matters of the present application.

Each disclosure of Patent Literatures 1 and 2 cited above is incorporated herein in its entirety by reference thereto and can be used as a basis or a part of the present invention as necessary. Modification and adjustment of each embodiment or each example are possible within the scope of the overall disclosure (including the claims) of the present invention and based on the basic technical concept of the present invention. Various combinations and selections of various disclosed elements (including each element in each claim, each element in each example, each element in each drawing, and so on) are possible within the scope of the claims of the present invention. That is, the present invention naturally includes various variations and modifications that could be made by those skilled in the art according to the overall disclosure including the claims and the technical concept. Further, using some or all of the disclosure in the literatures cited above as necessary, in combination with the matters described herein, as part of the disclosure of the present invention in accordance with the object of the present invention, shall be deemed to be included in the disclosed matters of the present application.

What is claimed is:

1. A position correction information delivery system comprising:
    a receiver obtaining a position thereof using a positioning scheme in which the receiver and a reference station whose position is known measure a phase of a carrier wave from a satellite and the receiver obtains position information thereof in real time based on position correction information transmitted from the reference station; and
    a first base station that manages a cell that the receiver camps on,
    wherein the receiver transmits a request for position correction information to the first base station, and
    wherein the first base station:
        on reception of the request from the receiver, selects a second base station having a reference station located nearby to the first base station or a reference station located nearby to the first base station, from one or more second base stations and/or one or more reference stations, registered in a database, each of the one or more second base stations having the reference stations and providing position correction information from the reference station, each of the one or more reference stations providing position correction information,
        receives the position correction information from the selected second base station or reference station, and
        broadcasts the position correction information to the cell.

2. The position correction information delivery system according to claim 1, wherein the first base station transmits a position correction information stop request to the selected second base station or reference station, and
    stops broadcasting the position correction information when receiving a position correction information stop request from each of all receivers that have requested the position correction information out of receivers camping on the cell.

3. The position correction information delivery system according to claim 1, wherein, when the receiver performs a handover while receiving the position correction information,
    a base station of a handover destination takes over, from the first base station of a handover source, broadcasting of the position correction information.

4. The position correction information delivery system according to claim 3, wherein the first base station of a handover source, sends information that the receiver performing the handover is receiving the position correction information that the first base station broadcasts to the cell, via an interface between base stations, to the base station of a handover destination.

5. The position correction information delivery system according to claim 3, wherein the handover destination base station without a reference station refers the database and selects a reference station or a base station having a reference station, located nearby to the handover destination base station without a reference station, when the receiver performing the handover from the first base station is a first receiver that requires position correction information among receivers camping on a handover destination cell.

6. The position correction information delivery system according to claim 1, wherein the first base station selects, as the reference station located nearby to the first base station, the second reference station having the reference station or the reference station, with a distance between the receiver and the reference station being within a range in which a desired positioning accuracy can be achieved by the receiver.

7. The position correction information delivery system according to claim 1, wherein on reception of a request for position correction information from a receiver camping on a second cell managed by the second base station having a reference station, the second base station, without reference to the database, broadcasts the position correction information provided by the reference station included in the second base station to the second cell, based on the request for position correction information received.

8. The position correction information delivery system according to claim 7, wherein the second base station broadcasts the position correction information provided by the reference station included in the second base station to the second cell, as long as at least one receiver that has transmitted the request for position correction information to the second base station is camping on the second cell.

9. The position correction information delivery system according to claim 1, wherein when selecting the reference station not included in the second base station but installed at a location other than the second base station, the first base station sends a request for position correction information to the selected reference station via a network to obtain the position correction data therefrom.

10. A base station constituting a position correction information delivery system using a positioning scheme in which a receiver obtaining a position thereof and a reference station whose position is known measure a phase of a carrier wave from a satellite and position information of the receiver is obtained in real time based on position correction information transmitted from the reference station, the base station comprising:
    a processor; and
    a memory storing program instructions executable by the processor, wherein the processor, when executing the program instruction stored in the memory, performs processing comprising:
        selecting a second base station having a reference station located nearby to the base station or a reference station located nearby to the base station, from one or more second base stations and/or one or more reference stations, registered in a database, each of the one or more second base stations having the reference stations and providing position correction information from the reference station, each of the one or more reference stations providing position correction information; and receiving the position correction information from the selected second base station or reference station and broadcasting the position correction information to the cell.

11. The base station according to claim 10, wherein the processor, when executing the program instructions stored in the memory, performs processing comprising:
transmitting a position correction information stop request to the selected second base station or reference station, when receiving a position correction information stop request from each of all receivers requesting the position correction information out of receivers camping on the cell; and
stopping broadcasting the position correction information.

12. The base station according to claim 10, wherein the processor, when executing the program instructions stored in the memory, performs processing comprising:
when the receiver performs a handover while receiving the position correction information,
sending information that the receiver is receiving the position correction information that the first base station broadcasts, via an interface between base stations, to the base station of a handover destination.

13. The base station according to claim 10, wherein the processor, when executing the program instructions stored in the memory, performs processing comprising:
selecting, as the reference station located nearby to the first base station, the second reference station having the reference station or the reference station, with a distance between the receiver and the reference station being within a range in which a desired positioning accuracy can be achieved by the receiver.

14. A position correction information delivery method comprising:
by a base station that delivers position correction information using a positioning scheme in which a receiver obtaining a position thereof and a reference station whose position is known measure a phase of a carrier wave from a satellite and position information of the receiver is obtained in real time based on position correction information transmitted from the reference station,
selecting a second base station having a reference station located nearby to the base station or a reference station located nearby to the base station, from one or more second base stations and/or one or more reference stations, registered in a database, each of the one or more second base stations having the reference stations and providing position correction information from the reference station, each of the one or more reference stations providing position correction information; and
receiving the position correction information from the selected second base station or reference station and broadcasting the position correction information to the cell.

15. The position correction information delivery method according to claim 14, comprising
transmitting, by the base station, a position correction information stop request to the selected second base station or reference station, when receiving a position correction information stop request from each of all receivers requesting the position correction information out of receivers camping on the cell, and
stopping, by the base station, broadcasting the position correction information.

16. The position correction information delivery method according to claim 14, comprising
when the receiver performs a handover while receiving the position correction information from the base station,
taking over, by a base station of a handover destination, from the base station of a handover source, broadcasting of the position correction information.

17. The position correction information delivery method according to claim 16, comprising
sending, by the base station of a handover source, information that the receiver performing the handover is receiving the position correction information that the base station of a handover source broadcasts to the cell, via an interface between base stations, to the base station of a handover destination.

18. The position correction information delivery method according to claim 14, comprising
selecting, by the base station, as the reference station located nearby to the first base station, the second reference station having the reference station or the reference station, with a distance between the receiver and the reference station being within a range in which a desired positioning accuracy can be achieved by the receiver.

19. The position correction information delivery method according to claim 14, comprising
on reception of a request for position correction information from a receiver camping on a second cell managed by the second base station having a reference station,
broadcasting, by the second base station, without reference to the database, the position correction information provided by the reference station included in the second base station to the second cell, based on the request for position correction information received.

20. The position correction information delivery method according to claim 14, comprising
when the reference station not included in the second base station but installed at a location other than the second base station is selected,
sending, by the base station, a request for position correction information to the reference station via a network to obtain the position correction data therefrom.

* * * * *